United States Patent
Saxena et al.

(10) Patent No.: US 8,590,028 B2
(45) Date of Patent: Nov. 19, 2013

(54) CONTENT LICENSING AND CONDITIONAL ACCESS USING A MOBILE DEVICE

(75) Inventors: Ashutosh Saxena, Gujarat (IN); Harigopal K. B. Ponnapalli, Andhra Pradesh (IN)

(73) Assignee: Infosys Limited, Bangalore (IN)

( * ) Notice: Subject to any disclaimer, the term of this patent is extended or adjusted under 35 U.S.C. 154(b) by 850 days.

(21) Appl. No.: 12/170,240

(22) Filed: Jul. 9, 2008

(65) Prior Publication Data

US 2009/0019501 A1 Jan. 15, 2009

(30) Foreign Application Priority Data

Jul. 9, 2007 (IN) ............................. 1475/CHE/2007

(51) Int. Cl.
*G06F 21/00* (2013.01)

(52) U.S. Cl.
USPC ................. 726/9; 726/2; 380/247; 380/248; 380/249; 380/250

(58) Field of Classification Search
USPC ............................. 726/2, 9, 27; 380/247–250
See application file for complete search history.

(56) References Cited

U.S. PATENT DOCUMENTS

| | | | |
|---|---|---|---|
| 5,546,471 A | 8/1996 | Merjanian | |
| 5,606,365 A | 2/1997 | Maurinus et al. | |
| 5,621,793 A | 4/1997 | Bednarek et al. | |
| 5,761,604 A | 6/1998 | Stough | |
| 5,790,753 A | 8/1998 | Krishnamoorthy et al. | |
| 5,790,842 A | 8/1998 | Charles et al. | |
| 5,815,195 A | 9/1998 | Tam | |
| 5,851,149 A | 12/1998 | Xidos et al. | |
| 5,886,732 A | 3/1999 | Humpleman | |
| 5,889,949 A | 3/1999 | Charles | |
| 5,892,900 A | 4/1999 | Ginter et al. | |
| 5,920,642 A | 7/1999 | Merjanian | |
| 5,926,647 A | 7/1999 | Adams et al. | |
| 5,933,498 A * | 8/1999 | Schneck et al. | 705/54 |
| 5,940,387 A | 8/1999 | Humpleman | |
| 5,999,207 A | 12/1999 | Rodriguez et al. | |
| 6,009,116 A | 12/1999 | Bednarek et al. | |
| 6,020,924 A | 2/2000 | Jahanghir | |
| 6,028,950 A | 2/2000 | Merjanian | |
| 6,047,317 A | 4/2000 | Bisdikian et al. | |
| 6,108,365 A | 8/2000 | Rubin et al. | |
| 6,175,861 B1 | 1/2001 | Williams, Jr. et al. | |
| 6,181,326 B1 | 1/2001 | Takahashi | |
| 6,181,364 B1 | 1/2001 | Ford | |
| 6,185,624 B1 | 2/2001 | Fijolek et al. | |

(Continued)

OTHER PUBLICATIONS

Banks et al., "Breaking Open the Set top Box," *Proc. SPIE*, vol. 3228, pp. 105-116, Feb. 1998.

(Continued)

*Primary Examiner* — Ghazal Shehni
(74) *Attorney, Agent, or Firm* — Klarquist Sparkman, LLP (57) ABSTRACT

Techniques and tools are described which provide control access mechanisms for contents made available by a service provider to a user. The user, after a registration process, uses a mobile application on a mobile device to generate a one-time content key. The content key is input into a set-top box which validates the key and provides access to the protected content. The mobile application allows for password protection for the user, as well as a recharging ability when its one-time content keys are exhausted.

23 Claims, 9 Drawing Sheets

(56) References Cited

U.S. PATENT DOCUMENTS

| | | |
|---|---|---|
| 6,195,797 B1 | 2/2001 | Williams, Jr. |
| 6,202,211 B1 | 3/2001 | Williams, Jr. |
| 6,223,222 B1 | 4/2001 | Fijolek et al. |
| 6,229,532 B1 | 5/2001 | Fujii |
| 6,240,464 B1 | 5/2001 | Fijolek et al. |
| 6,259,443 B1 | 7/2001 | Williams, Jr. |
| 6,268,849 B1 | 7/2001 | Boyer et al. |
| 6,272,147 B1 | 8/2001 | Spratt et al. |
| 6,275,853 B1 | 8/2001 | Beser et al. |
| 6,311,204 B1 | 10/2001 | Mills |
| 6,314,409 B2 | 11/2001 | Schneck et al. |
| 6,317,795 B1 | 11/2001 | Malkin et al. |
| 6,331,987 B1 | 12/2001 | Beser |
| 6,334,216 B1 | 12/2001 | Barth |
| 6,347,294 B1 | 2/2002 | Booker et al. |
| 6,351,773 B1 | 2/2002 | Fijolek et al. |
| 6,370,147 B1 | 4/2002 | Beser |
| 6,378,131 B2 | 4/2002 | Cunningham et al. |
| 6,381,748 B1 | 4/2002 | Lin et al. |
| 6,400,996 B1 | 6/2002 | Hoffberg et al. |
| 6,418,424 B1 | 7/2002 | Hoffberg et al. |
| 6,442,158 B1 | 8/2002 | Beser |
| 6,489,979 B1 | 12/2002 | Belknap et al. |
| 6,493,874 B2 | 12/2002 | Humpleman |
| 6,510,162 B1 | 1/2003 | Fijolek et al. |
| 6,519,770 B2 | 2/2003 | Ford |
| 6,526,583 B1 | 2/2003 | Auld et al. |
| 6,535,854 B2 | 3/2003 | Buchner et al. |
| 6,535,927 B1 | 3/2003 | Kim |
| 6,542,465 B1 | 4/2003 | Wang |
| 6,543,052 B1 | 4/2003 | Ogasawara |
| 6,546,016 B1 | 4/2003 | Gerszberg et al. |
| 6,553,568 B1 | 4/2003 | Fijolek et al. |
| 6,560,203 B1 | 5/2003 | Beser et al. |
| 6,560,685 B1 | 5/2003 | Jackson |
| 6,577,642 B1 | 6/2003 | Fijolek et al. |
| 6,604,240 B2 | 8/2003 | Ellis et al. |
| 6,611,957 B2 | 8/2003 | Ebisawa |
| 6,618,387 B1 | 9/2003 | Liu et al. |
| 6,622,148 B1 | 9/2003 | Noble et al. |
| 6,636,485 B1 | 10/2003 | Fijolek et al. |
| 6,639,975 B1 | 10/2003 | O'Neal et al. |
| 6,651,250 B1 | 11/2003 | Takai |
| 6,654,387 B1 | 11/2003 | Beser et al. |
| 6,657,991 B1 | 12/2003 | Akgun et al. |
| 6,662,007 B2 | 12/2003 | Yuen |
| 6,662,135 B1 | 12/2003 | Burns et al. |
| 6,675,267 B2 | 1/2004 | Rovati |
| 6,678,004 B1 | 1/2004 | Schultheiss et al. |
| 6,683,630 B1 | 1/2004 | Shoff et al. |
| 6,697,862 B1 | 2/2004 | Beser et al. |
| 6,721,949 B1 | 4/2004 | Tavoletti et al. |
| 6,732,179 B1 | 5/2004 | Brown et al. |
| 6,732,368 B1 | 5/2004 | Michael et al. |
| 6,742,121 B1 | 5/2004 | Safadi |
| 6,742,182 B1 | 5/2004 | Perlman |
| 6,744,967 B2 | 6/2004 | Kaminski et al. |
| 6,745,223 B1 | 6/2004 | Nobakht et al. |
| 6,745,245 B1 | 6/2004 | Carpenter |
| 6,748,372 B2 | 6/2004 | Van Loo |
| 6,754,210 B1 | 6/2004 | Ofek |
| 6,754,622 B1 | 6/2004 | Beser et al. |
| 6,769,018 B2 | 7/2004 | Gagnon |
| 6,775,268 B1 | 8/2004 | Wang et al. |
| 6,775,276 B1 | 8/2004 | Beser |
| 6,775,713 B1 | 8/2004 | Liu et al. |
| 6,785,292 B1 | 8/2004 | Vogel |
| 6,789,159 B1 | 9/2004 | Carr et al. |
| 6,804,262 B1 | 10/2004 | Vogel et al. |
| 6,807,612 B2 | 10/2004 | Jackson |
| 6,816,500 B1 | 11/2004 | Mannette et al. |
| 6,837,789 B2 | 1/2005 | Garahi et al. |
| 6,859,850 B1 | 2/2005 | MacCormack |
| 6,865,555 B2 | 3/2005 | Novak |
| 6,868,292 B2 | 3/2005 | Ficco et al. |
| 6,879,963 B1 | 4/2005 | Rosenburg |
| 6,882,709 B1 | 4/2005 | Sherlock et al. |
| 6,904,609 B1 | 6/2005 | Pietraszak et al. |
| 6,915,525 B2 | 7/2005 | Ozawa |
| 6,922,845 B2 | 7/2005 | Yap et al. |
| 6,925,180 B2 | 8/2005 | Iwamura |
| 6,938,166 B1 | 8/2005 | Sarfati et al. |
| 6,940,874 B2 | 9/2005 | Ruszczyk et al. |
| 6,944,881 B1 | 9/2005 | Vogel |
| 6,948,184 B1 | 9/2005 | Del Sol et al. |
| 6,952,428 B1 | 10/2005 | Necka et al. |
| 6,961,430 B1 | 11/2005 | Gaske et al. |
| 6,961,955 B1 | 11/2005 | Durden et al. |
| 6,966,063 B1 | 11/2005 | Meric et al. |
| 6,971,121 B2 | 11/2005 | West et al. |
| 6,985,437 B1 | 1/2006 | Vogel |
| 6,986,062 B2 | 1/2006 | Carpenter |
| 6,986,157 B1 | 1/2006 | Fijolek et al. |
| 6,990,676 B1 | 1/2006 | Proehl et al. |
| 6,990,677 B1 | 1/2006 | Pietraszak et al. |
| 6,990,678 B2 | 1/2006 | Zigmond |
| 7,003,796 B1 | 2/2006 | Humpleman |
| 7,017,066 B2 | 3/2006 | Retter et al. |
| 7,020,888 B2 | 3/2006 | Reynolds et al. |
| 7,027,768 B2 | 4/2006 | Hill |
| 7,050,097 B2 | 5/2006 | Schick et al. |
| 7,058,803 B2 | 6/2006 | Carr |
| 7,068,597 B1 | 6/2006 | Fijolek et al. |
| 7,072,337 B1 | 7/2006 | Arutyunov et al. |
| 7,072,493 B2 | 7/2006 | Venkatesan et al. |
| 7,073,055 B1 | 7/2006 | Freed et al. |
| 7,076,661 B2 | 7/2006 | Chen et al. |
| 7,080,400 B1 | 7/2006 | Navar |
| 7,085,306 B1 | 8/2006 | Voldman et al. |
| 7,088,678 B1 | 8/2006 | Freed et al. |
| 7,089,580 B1 | 8/2006 | Vogel et al. |
| 7,107,326 B1 | 9/2006 | Fijolek et al. |
| 7,111,319 B1 | 9/2006 | Watkins |
| 7,114,070 B1 | 9/2006 | Willming et al. |
| 7,116,892 B2 | 10/2006 | Wajs |
| 7,137,026 B2 | 11/2006 | Aija et al. |
| 7,146,007 B1 | 12/2006 | Maruo et al. |
| 7,146,632 B2 | 12/2006 | Miller |
| 7,216,368 B2 | 5/2007 | Ishiguro |
| 2002/0165912 A1 | 11/2002 | Wenocur et al. |
| 2004/0255143 A1* | 12/2004 | Wemyss et al. ............... 713/200 |
| 2007/0180496 A1* | 8/2007 | Fransdonk ........................ 726/3 |
| 2008/0262968 A1 | 10/2008 | Saxena et al. |

OTHER PUBLICATIONS

Ciciora, "Inside the Set-top Box," *IEEE Spectrum*, vol. 32, Issue 4, pp. 70-75, Apr. 1995.

Frantz, "The Future of Digital Video," White Paper, *Texas Instruments*, pp. 1-6, Sep. 2005.

Huang, "Set-top Box Market: Concept and Objectives," *DSP Engineering*, pp. 1-5, Summer 2001.

Sohi et al., "A Multi-Standard Set-top Box Channel Decoder," *2000 IEEE Workshop on Signal Processing Systems*, pp. 295-304, 2000.

Atallah et al., "A Survey of Anti-Tamper Technologies," *CrossTalk, The Journal of Defense Software Engineering*, Nov. 2004, pp. 12-16.

Das et al., "A novel remote user authentication scheme using bilinear pairings," *Computers & Security*, vol. 25, Issue 3, May 2006, pp. 184-189.

dmoz open directory project, search results for term "Software Protection" dated Oct. 9, 2005, 3 pp.

Dongles Software Protection, "This page was developed to highlight Software Protection technologies available in Australia," John Rohde JBR's Visual Solutions, 2004, 4 pages.

Gangishetti et al., "Identify Based Multisignatures," *Informatica*, vol. 17, No. 2, 2006, pp. 177-186.

Gangishetti et al., "Threshold key issuing in identity-based cryptosystems," *Computer Standards & Interfaces*, vol. 29, Issue 2, Feb. 2007, pp. 260-264.

(56) References Cited

OTHER PUBLICATIONS

International Planning and Research Corporation, "First Annual BSA and IDC Global Software Piracy Study," Jul. 2004, 14 pp.

Kancharla et al., "Identity Based Strong Designated Verifier Signature Scheme," *Informatica*, May 31, 2007, vol. 18, No. 2, 239-252.

Kumar et al., "Identity Based Strong Designated Verifier Signature Scheme," *Cryptology ePrint Archive*, 2006, 7 pages.

Naumovich et al., "Preventing Piracy, Reverse Engineering, and Tampering," *IEEE Computer Society*, vol. 6, Issue 7, Jul. 2003, pp. 64-71.

Nickerson et al., "The Encoder Solution to Implementing Tamper Resistant Software," *CERT/IEEE Information Survivability Workshop*, Oct. 2001, 4 pages.

Palsberg et al., "Experience with Software Watermarking," CERIAS and Department of Computer Science, Purdue University, 2000, 9 pp.

SafeNet, Inc., "Choosing a Best-in-Class Software Protection Solution," 2005, 6 pp.

Saxena, "Threshold SKI Protocol for ID-based Cryptosystems," *Third International Symposium on Information Assurance and Security*, Aug. 2007, pp. 65-70.

Shailja et al., "Universal Designated Multi Verifier Signature without Random Oracles," *9th International Conference on Information Technology (ICIT'06)*, Dec. 2006, pp. 168-171.

Softletter, "On Dealing With Software Pirates," vol. 18, No. 23, Oct. 31, 2002, 8 pp.

Wang, "Tamper Resistance for Software Protection," Thesis for Degree of Master of Science, 2005, 64 pp.

\* cited by examiner

Fig. 2  Content Protection System Example

Fig. 9

CONTENT LICENSING AND CONDITIONAL ACCESS USING A MOBILE DEVICE

BACKGROUND

As both demand for and supply of televised content grows, customers and media providers are becoming increasingly involved with pay television services. Pay television or pay-TV refers to subscription-based television services, typically provided by both analog and digital cable and satellite, but also increasingly by digital terrestrial methods. Pay per view (PPV) services are similar to subscription-based pay TV services and in that one must pay to have the broadcast decrypted for viewing, but typically entail a one-off payment for a single or time-limited viewing. "Free" variants are free-to-air (FTA) and free-to-view (FTV), however FTV services are normally encrypted and decryption cards either come as part of an initial subscription to a pay TV service or can be purchased for a one-off cost.

Some pay television services utilize a set-top box. A set-top box is a device that enables a television set to receive and decode digital television (DTV) broadcasts. DTV set-top boxes are sometimes called receivers. In some implementations, set-top boxes additionally provide a user interface to the Internet. In the Internet realm, a set-top box is sometimes a specialized computer that can "talk to" the Internet—that is, it contains a Web browser and supports Internet protocols, such as TCP/IP. When performing network communications, the service to which the set-top box is attached may be through a telephone line or through a cable TV company; such a setup may enable interactive two-way services. Two-way services are combined with the broadcast feed and a return path, typically with a charge for access and /or for the interactive content offered. Content on offer includes movie, gaming, betting, shopping and banking services. This often requires a secure conditional access system and mutual authentication between the end user and the set-top box.

Conditional access systems are typically composed of two parts: the head-end part and the reception-end part. At the head-end, the digital content (including video, audio and data), to which the operator (or service provider) wishes to restrict access, is scrambled by a control word (CW) derived from a constantly changing pseudo-random binary sequence generator. It is desirable to protect this control word as well, and therefore it is oftentimes encrypted with a service key (SK). The encrypted control word is then packaged into so-called entitlement control message (ECM). Further, the service key is encrypted with an individual key (IK) supplied by the subscriber management system and is then packaged with entitlement data into entitlement management message (EMM). Finally, the scrambled content, entitlement control message, and entitlement management message are together broadcast in the same channel.

At the reception-end, the set-top box (STB) filters the entitlement management message and entitlement control message according to the parameters provided by the user's personalized smart card (SC) and then forwards these messages to smart card. The smart card then decrypts the entitlement management message using the individual key (here stored in the smart card) to get the service key and the entitlement data. After having passed the verification of the access entitlement, the smart card uses the service key to decrypt the encrypted control word and returns the control word to the set-top box so that set-top box will be allowed to descramble the scrambled content.

In such an implementation, the control word is very vulnerable to the link between smart card and set-top box. If the smart card transfers the control word in plaintext form to the set-top box, an attacker, instead of being forced to compromise the smart card, can simply obtain the control word by monitoring the interface between the smart card and set-top box. Further, the attacker can distribute the control word through other channels to unauthorized users so that they can also access the protected content without license. This is a serious threat to the security of such a conditional access system. Thus, the control word must be protected from this attack.

On the other hand, the absence of mutual authentication mechanism in such an implementation would allow a fake set-top box, for example a computer with a hacked smart card reader, to challenge smart card or a pirated smart card to be used on set-top box to access the protected content.

Because of the various limitations presented in traditional methods of pay television license control, there is a need for an improved technique that reduces the above mentioned drawbacks that exist in the conventional methods.

SUMMARY

Methods and systems to control a license for a software application are described herein. Particular aspects of the techniques and tools are described as follows.

In one aspect, a method for controlling access to content provided by a service provider is described. The method comprises providing a user with a set-top box which is configured to validate the user's ability to view protected content by accepting a content token. The method also comprises providing the user with a mobile application to run on a mobile device, the mobile application being configured to generate the content token when the user desires to view the protected content. The method also comprises registering the user and the set-top box to view the protected content, encrypting the protected content using a symmetric key associated with the user, encrypting the symmetric key such that the set-top box can decrypt the symmetric key when accepting the content token from the user, and transmitting the encrypted protected content and the symmetric key to the set-top box.

In another aspect, a system for controlling access to content provided by a service provider is described. The system comprises a registration kit provided to a user for registering the user, a set-top box synchronized with the registration kit, and a software application configured to execute on a mobile device for generating a content token. The mobile device is also configured to generate the content token upon request by the user to allow the user to view the content through the set-top box.

In another aspect, computer-readable media are described which contain instructions which cause a computer to perform a method for controlling access to content from a service provider. The method comprises accepting a set of parameters in a mobile device of the user and updating details of the user in a service provider database after registration. The method also comprises, upon request by a user, generating a dynamic key for viewing protected content on a set-top box and inputting the dynamic key into the set-top box to access the content. The dynamic key is also validated by the set-top box against the set of parameters and the details of the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

DETAILED DESCRIPTION

Described herein are techniques and systems for implementing license control using a computing device to validate license permissions for a user to view content. Generally, the techniques and tools described herein relate to set-top box licensing, and more particularly, to conditional access using a mobile device. In one exemplary implementation, a user installs, or has installed, a mobile application on a mobile device. The mobile device is subsequently used to generate content tokens which are input into a set-top box in order to view protected content.

Modifications and adaptations will be apparent to those skilled in the relevant arts in view of the following description in view of the accompanying drawings and the appended claims. While the systems and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present techniques and systems and not in limitation thereof.

Examples of Enforcing a Usage Agreement

Figure 1:
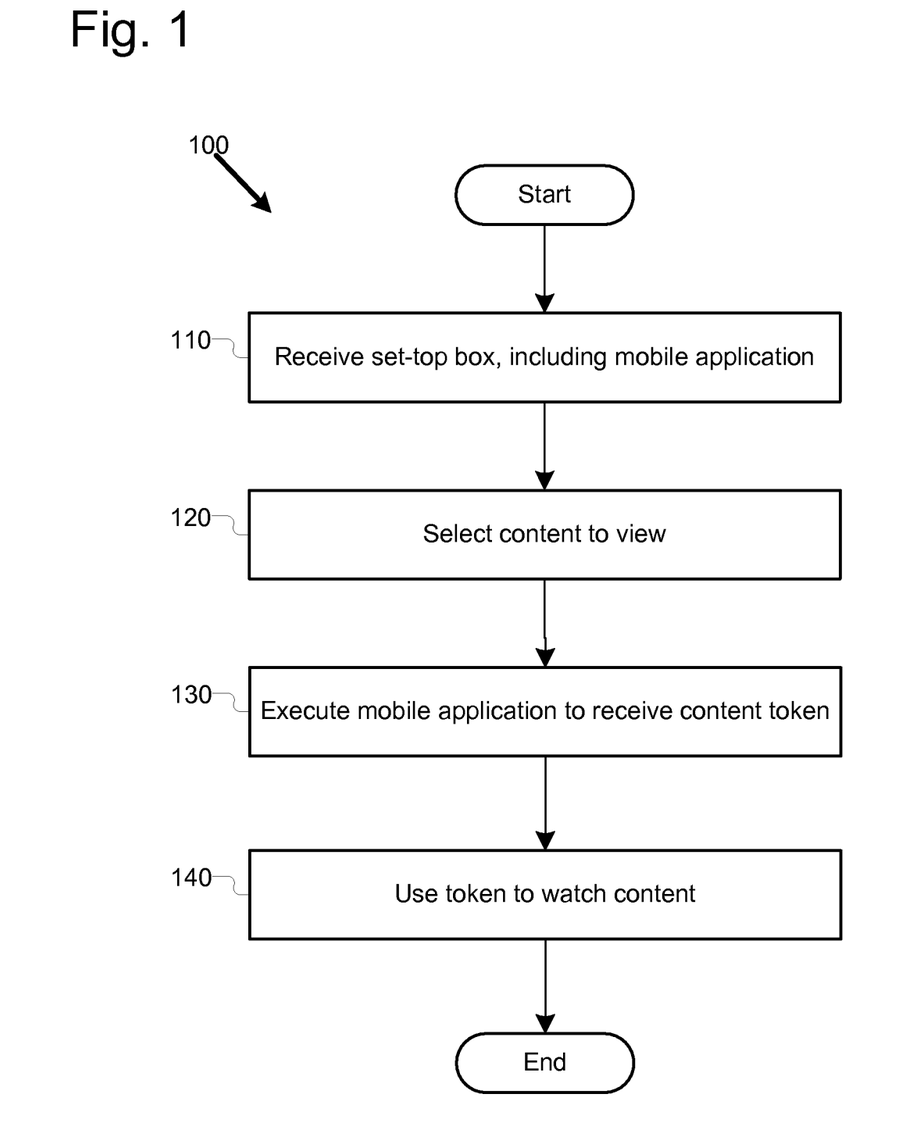
FIG. 1 is a flowchart illustrating an example process for a user gaining access to protected content.

FIG. 1 is a flowchart illustrating an exemplary process for a user to acquire access to a piece of protected content from a service provider in accordance with the techniques and tool described herein. The techniques described herein, including the process of FIG. 1, allow a user to access protected content while avoiding the pitfalls of existing techniques. While the processes described below provide additional detail, the process of FIG. 1 illustrates, from the perspective of a user, how these techniques and tools are used.

FIG. 1 begins at block 110, where a user receives a set-top box along with a mobile application for a mobile device. As will be described below, the process of receiving the mobile application may take place as part of receipt of a registration kit which the user receives along with the set-top box. In one implementation, the mobile application is installed on a mobile device, which may be a device the user already owns or may be specifically provided for the purpose of license management by the service provider. Next, at block 120, the user selects content which he or she would like to view via the STB. Then, at block 130, the user executes the mobile application on the mobile device to receive a content token. This token is utilized, at block 140, to watch the content, typically by inputting the token into the STB and allowing the STB to validate the user's right to access the content based on the provided token.

Exemplary Set-Top Box Licensing System

Figure 2:
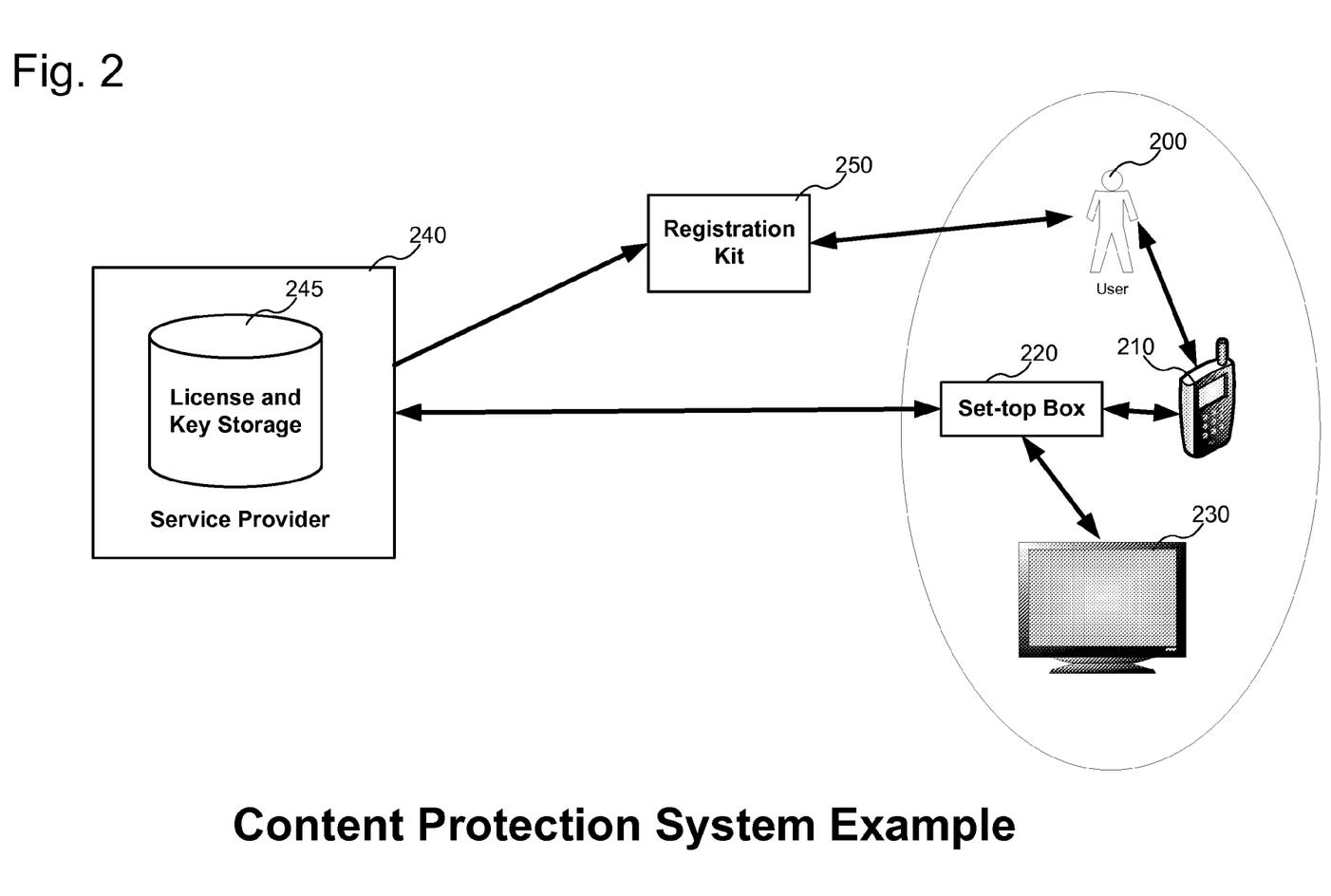
FIG. 2 is a block diagram illustrating an example of a content protection system according to techniques described herein.

FIG. 2 represents one implementation of a system for verifying licenses and controlling access to content offered by a service provider 240 in association with a user 200. In the illustrated implementation, the system comprises a set-top box 220 mobile device 210, registration kit 250, service provider 240, and display device 230. In one implementation, the display device 230 comprises a television set (TV), although in alternative implementations, content which is licensed using the system may be displayed on other devices, such as, for example, a computer monitor. The service provider 240 provides access to content via a server 245. In various implementations, the SP may be a network or other broadcaster, a cable company, an over-the-air television provider, an internet-based video provider or other provider. Mobile device 210 may be a mobile device 210 which the user 200 uses to generate a dynamic key to view content offered by service provider 240 on the users' TV or other display device 230. Depending on the implementation, the mobile device may be a mobile device owned by the user prior to setup and registration of the system, or may be provided by the SP or another party for the specific purpose of facilitating content access. Additionally, while the device 210 is referred to as a "mobile device" herein, and may include devices such as PDAs, mobile phones, texting devices, or other hand-held devices, in some implementations a non-mobile device may be used. For example a user may set up their personal computer to interoperate with the STB for licensing control.

A registration kit 250 comprises a unique registration kit number and software application to be installed on the user's mobile device 210 as well as a key for that software application. As is discussed below, this registration kit may be installed one or more times as is useful to the user or as is suggested by the user's access needs. As discussed previously, a set-top box 220 is a device that enables a television set 230 with a user interface for content access and also to receive and decode DTV broadcasts. The content on offer from the service provider may be of various types, including episodic television, movies, gaming, one-time events (such as sporting events), shopping, banking services, or other content.

Exemplary Television Licensing Techniques

Figure 3:
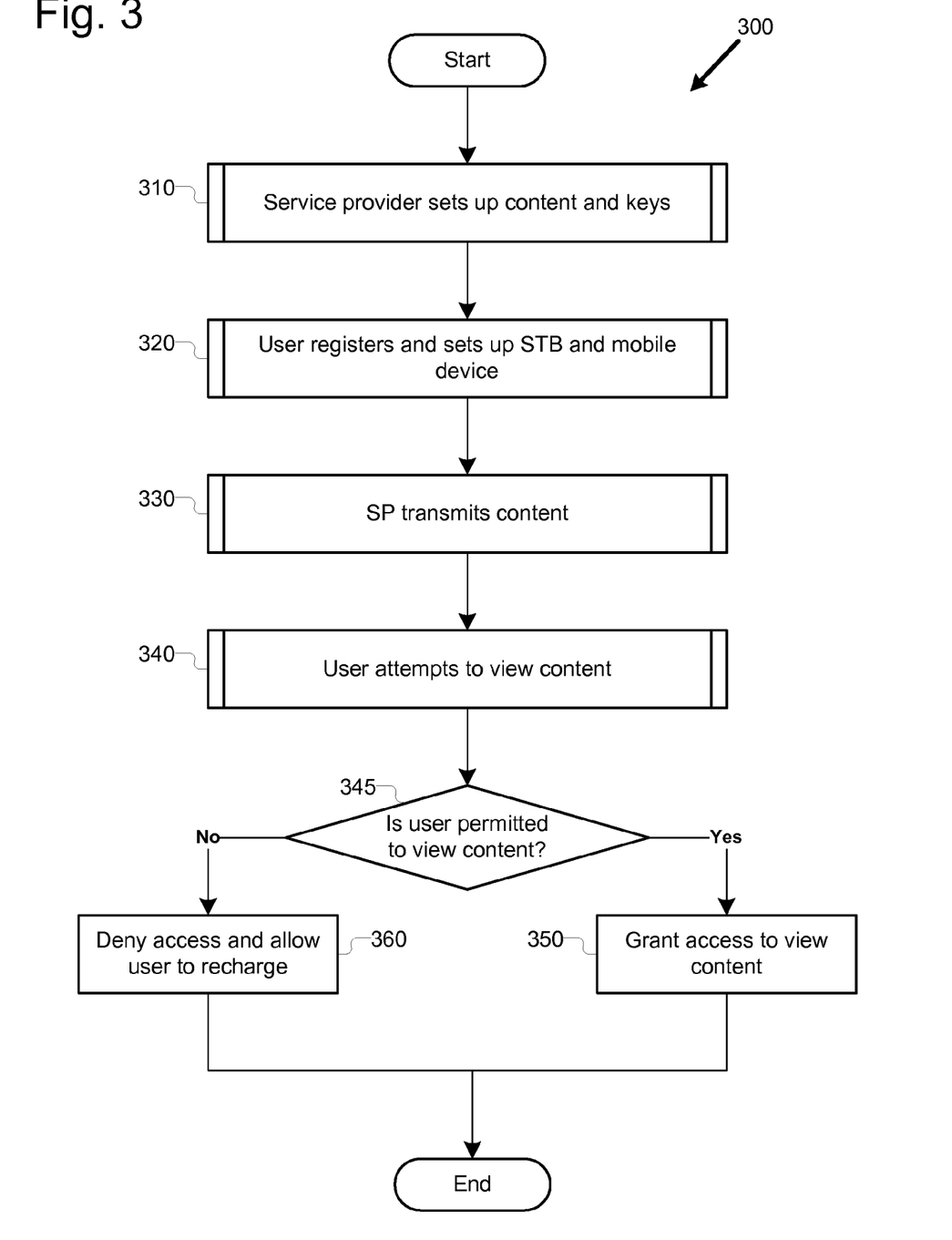
FIG. 3 is a flowchart illustrating an example process for verifying and allowing a user to access protected content.

FIG. 3 is a flowchart illustrating an exemplary process 300 for enforcing a user license for television content. Various processes illustrated in FIG. 3 are performed by entities illustrated in FIG. 2, including the service provider 240, user 200, set-top box 220 and mobile device 210. Various sub-processes of process 200 will be described in greater detail below.

The process begins at block 310, where, during an initialization phase, the service provider sets itself up to provide protected content to users. This includes the creation of registration keys and particular internal databases in some implementations. Particular implementations of block 310 are described below with respect to FIG. 4.

Next, at block 320, during a registration phase, the user is able to register and prepare both a set-top box and mobile device to facilitate the content control processes described herein. Particular implementations of block 320 are described below with respect to FIG. 5. The process then continues to block 330, where a transmitting phase is entered. In this phase, the service provider or broadcaster 240 uses an encryption key in order to transmit an encrypted, protected version of content requested by the user. Particular implementations of block 330 are described below with respect to FIG. 6.

Next, at block 340, in a viewing attempt phase, the user 200 invokes the mobile software in his mobile device 210 to obtain a content token in order to view the encrypted content. Particular implementations of block 340 are described below with respect to FIG. 7.

Next, the process enters a user validation phase, where the STB determines whether the user has rights to view the protected content. Thus, at decision block 345, the STB determines if the user is permitted to view the content. Particular implementations of block 345 are described below with respect to FIG. 8. If the user is determined to have permission, at block 350 the user is granted access to view the content. If not, at block 360, the user is denied access, and, if desired, the user is allowed to go through a modified version of the registration process in order to secure permission for future viewings. In either event, the process then ends.

Figure 4:
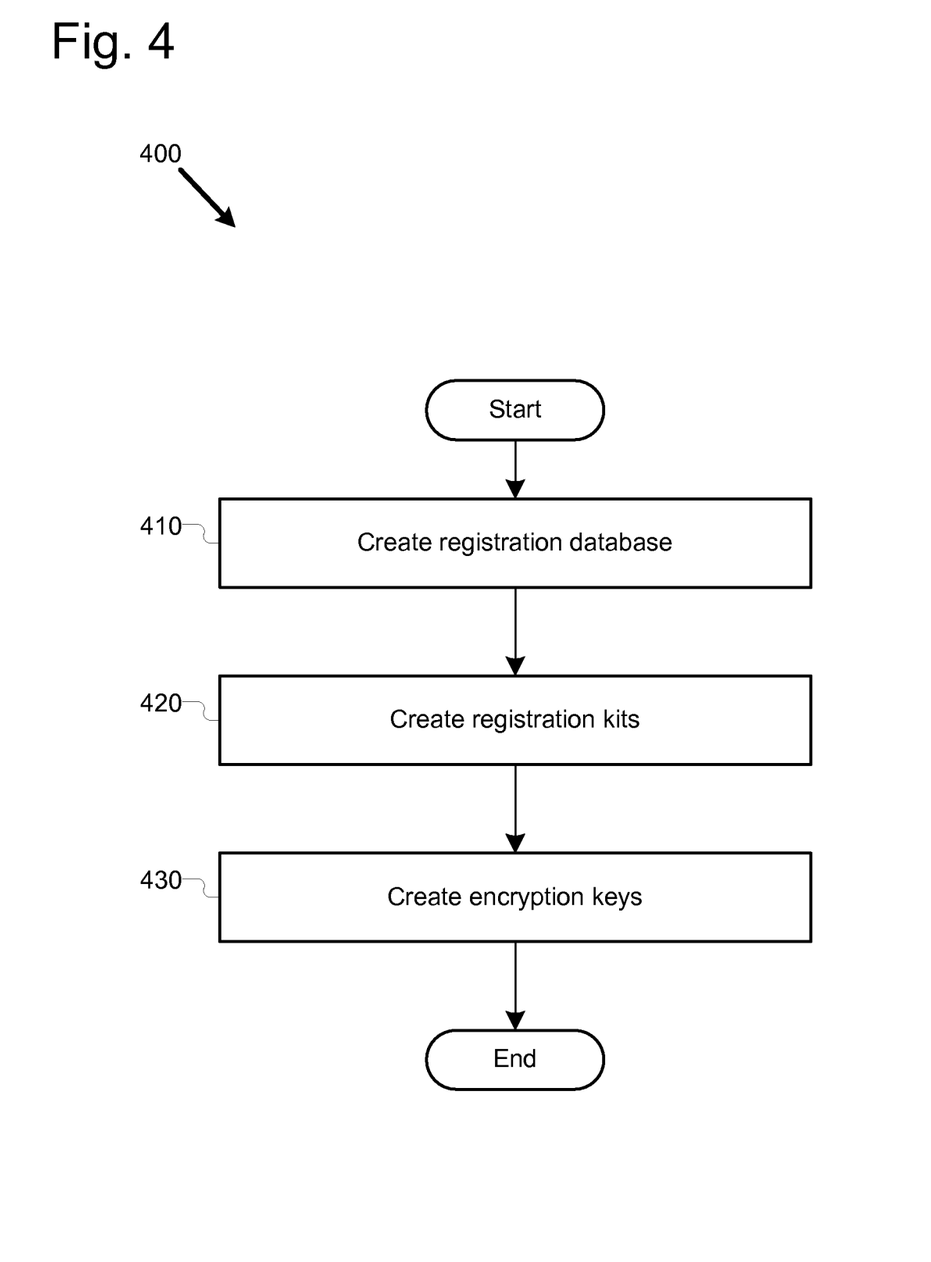
FIG. 4 is a flowchart illustrating an example process for setting up a service provider.

FIG. 4 is a flowchart illustrating an exemplary process 400 performed by the service provider 240 during a setting up phase. The process is performed in order to allow the SP to initialize itself with registration kits and the databases needed to provide protected content according to the techniques described herein. The process begins at block 410, where the SP creates a registration database. This database, in one implementation, contains registration detail to be used with registration kits. The process then continues to block 420, where the service provider prepares registration kits, such as registration kit 250. In one implementation, a registration kit will include a registration number as well as mobile software to be executed on a mobile device. Thus, the SP can populate its registration database with records which match up to created registration kits; as users purchase (or otherwise obtain) set-top boxes and registration kits, the service provider can populate the registration database with user information keyed to the created registration numbers. In some implementations, the registration database may also contain additional information, such as a secret key to be used when generating content tokens. This information may be input into the database later, as users sign up for service.

Finally, at block 430, the SP 140 also creates an active database of symmetric encryption keys along with encrypted versions of the symmetric keys. In one implementation, this encryption of the symmetric key is done using the secret code provided in the registration kit along with, if desired, a user's registration number.

Figure 5:
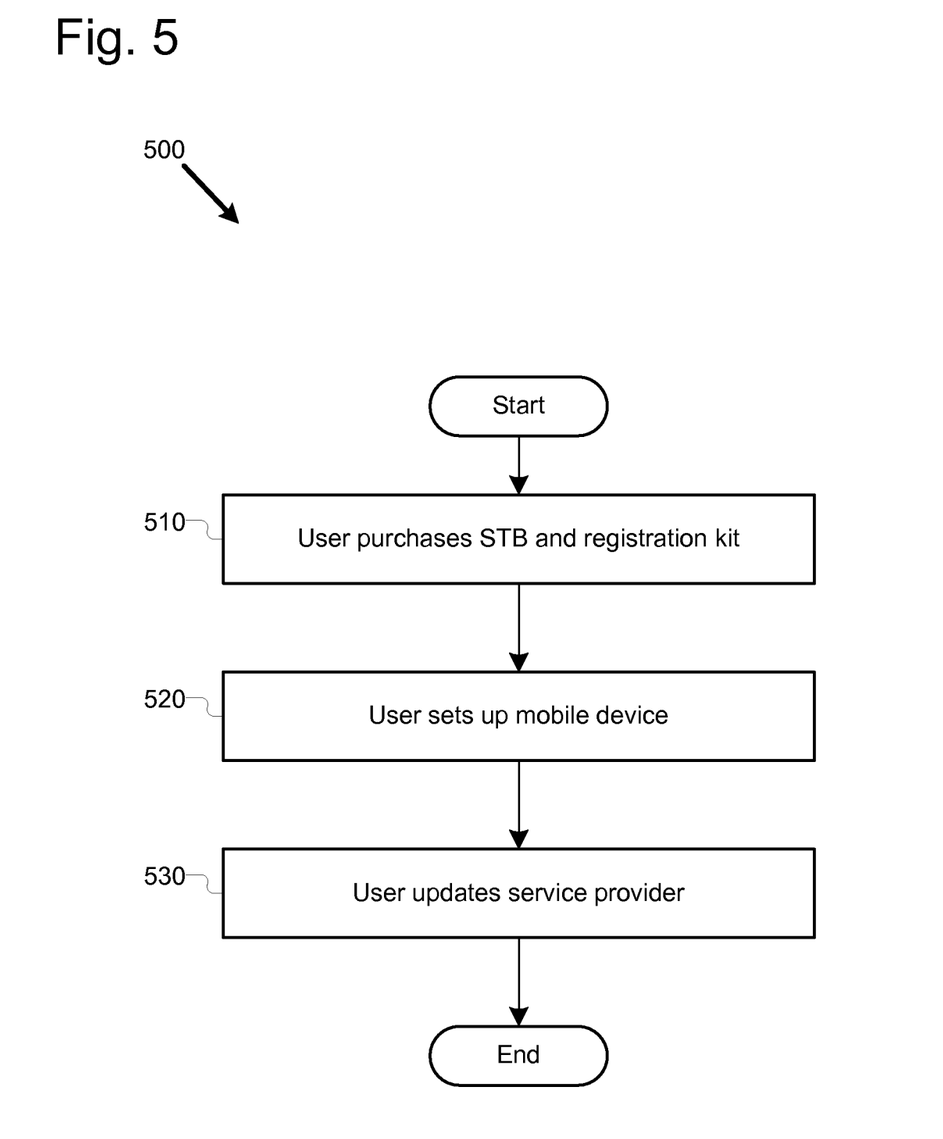
FIG. 5 is a flowchart illustrating an example process for registering a user with a service provider.

FIG. 5 is a flowchart illustrating an exemplary process 500 performed during a user registration phase. The process is performed in order to provide a user with a set-top box as well as a properly-configured mobile device to use when determining user permissions. The process begins at block 510, where a potential consumer or user 200 purchases the STB 220 along with the registration kit 250. In one implementation, the STB may not be purchased outright, but may be loaned or leased to the user from the SP. The user then, at block 520, sets up his or her personal mobile device 210 and as well as the STB 220 using the kit. In one implementation, the registration kit comprises software for the mobile device as well as an identifying registration number. In another implementation, the user may receive the mobile device outright from the SP as part of a registration kit. The registration may also contain a software key to facilitate installation of the mobile application on the mobile device.

Next, at block 530, the user, using the registration kit, updates the service provider 240. This may be done, in various implementations, using software which is included in the registration kit, or via a telephone or other form of communication. The updating may involve the sharing of secret (or sensitive) information, such as billing information or personal identifying information, with the SP, as well as associating this information with the registration number. During this setup, the SP 240 may update its active encrypted key value database based on information received from the user. The SP may take the secret information and utilize this to encrypt symmetric encryption keys for later transmission to a user.

As mentioned above, in an alternative implementation, the system of FIG. 2 may utilize a recharging phase in order to allow a user who no longer has permission to view content again, in essence "recharging" the user's permissions. In one implementation, not shown, the user 200 purchases a recharge kit and performs a similar exercise to that above, with the SP accordingly updating its back-end to accommodate any new information.

Figure 6:
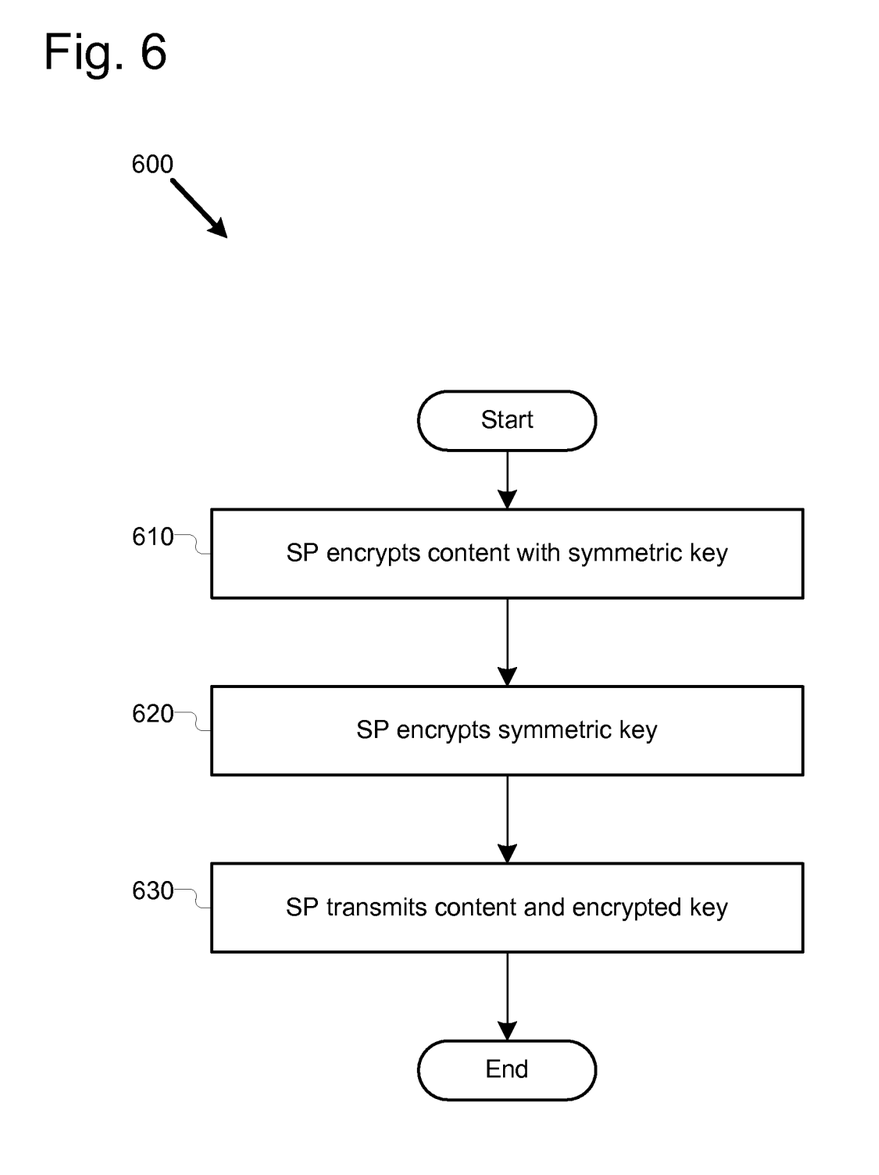
FIG. 6 is a flowchart illustrating an example process for a service provider to transmit protected content.

FIG. 6 is a flowchart illustrating an exemplary process 600 performed by the service provider during a content transmitting phase. The process is performed in order to provide protected content which can be viewed by a user if the user has sufficient permissions. The process begins at block 610, where the SP 240, using the symmetric encryption key stored in the active database, encrypts the content. Next, at block 620, the SP encrypts the symmetric key. In various implementations, this encryption may be performed by the SP at the time of transmission of the content or, alternatively, may be performed at an earlier point in time, such as when sufficient user information is received to perform the encryption. Finally, at block 630, the encrypted content and symmetric key are both transmitted to the user.

Figure 7:
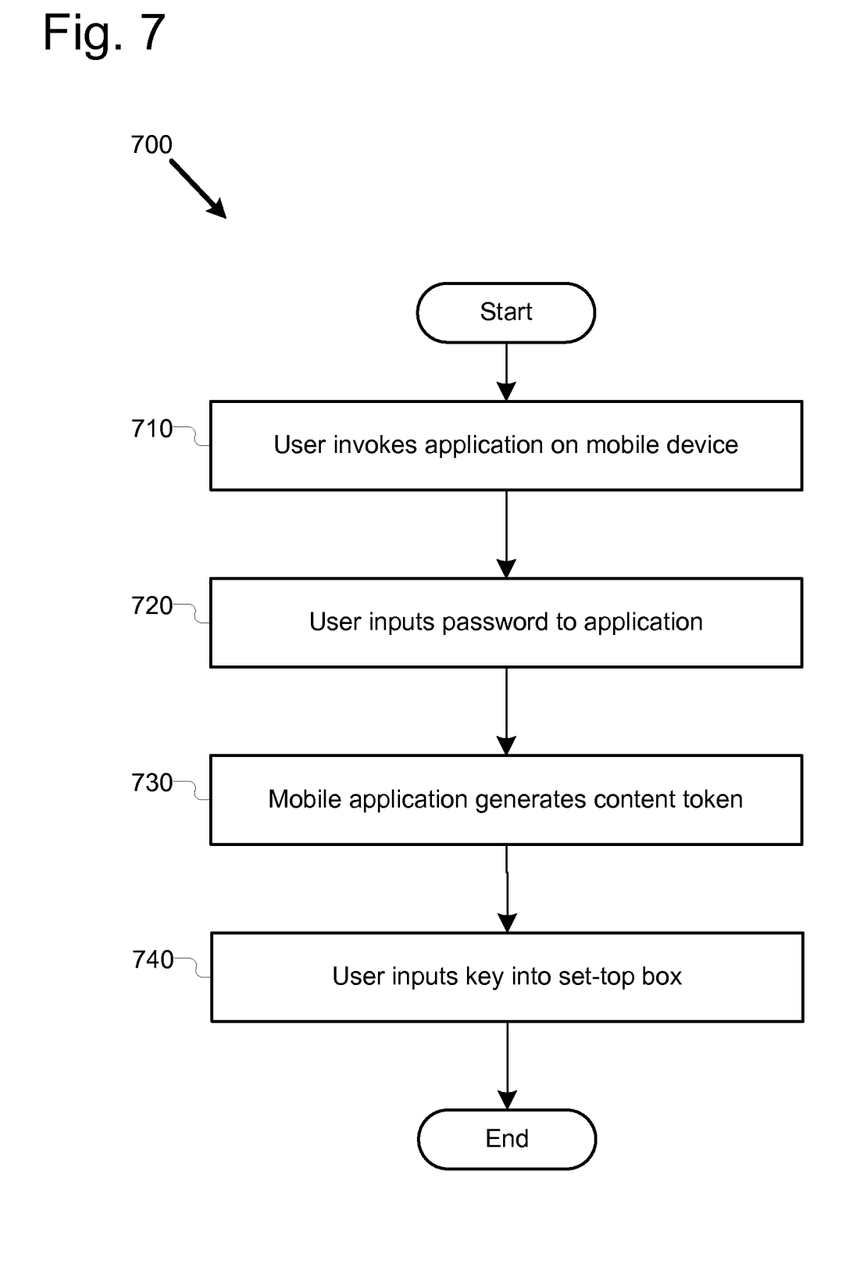
FIG. 7 is a flowchart illustrating an example process for a user to attempt to view protected content.

FIG. 7 is a flowchart illustrating an exemplary process 700 performed during a view attempt phase. The process is performed in order to generate a content token which is checked by the STB to determine if the user may view the content. In one implementation, the content token is a dynamically-generated encryption key which allows the encrypted symmetric key to be decrypted by the STB. In alternative implementations, the content token may take other forms or may include additional information, such as time- or event-based license information.

The process begins at block 710, where the user invokes the mobile application on his or her mobile device 210 to generate a content token. Next, at block 720, if the user or SP has configured the application to require a password, the user inputs his or her password into the mobile device. Then, at block 730, if the password supplied is correct, then at block 730 the software on the mobile device gives the user a content token to view the encrypted content. In one implementation, this token is a one-time use token, however, in alternative implementations, the token may be used more than once over a time period. Finally, at block 740, the user inputs the content token into the STB. Typically, the content token takes the form of an alphanumeric code. Alternatively, the content token takes a different form, such as a binary value. Entry of the token may be done, in various implementations, manually by the user, by selecting letters and numbers through the STB's user interface, or may be done via a connection between the STB and the mobile device, such as a local network, the Internet, a USB connection, or an IR connection.

Figure 8:
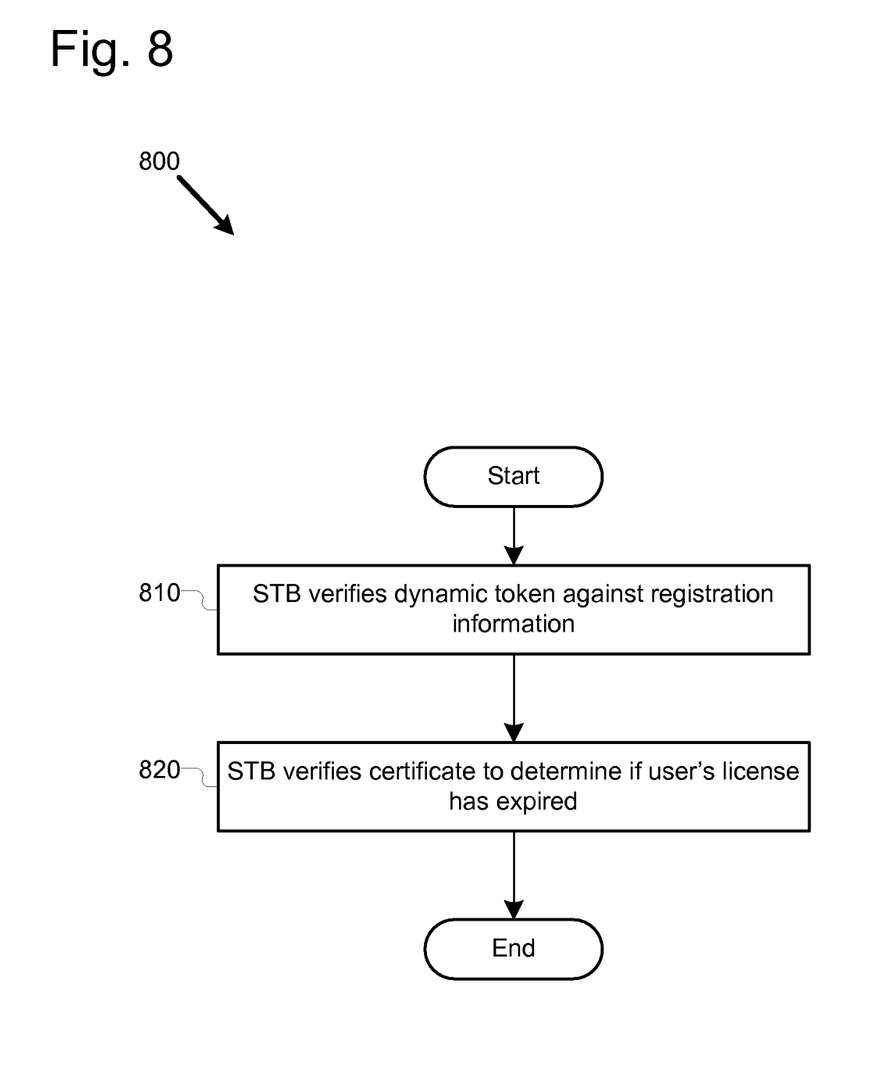
FIG. 8 is a flowchart illustrating an example process for validating a content token provided to validate a user.

FIG. 8 is a flowchart illustrating an exemplary process 800 performed by a set-top box during a user validation phase. The process is performed in order to determine if a user has permission to view protected content. After the user 200 has given the one-time content token to watch the encrypted content, the STB 120, at block 810, verifies the token value using the information which was stored in the STB at the time of registration. In an alternative implementation, the STB may also review previous attempts to watch the content during this process. In one implementation, the process may optionally continue to block 820, where the STB enforces time- and event-based content access by, for example, verifying a license certificate. In such an implementation, the mobile application is bundled with a certificate during the registration phase; this certificate contains information that facilitates the STB determining whether the user is still within a time period for accessing the protected content. One benefit of this process over traditional content verification processes is that this validation may be erformed offline, rather than requiring action by the service provider 240. If the STB cannot verify the content token, the STB may refuse to allow viewing of the protected content unless the user 200 performs a recharging process.

Exemplary Usage

The instant technique and tools may be better illustrated, through the following usage scenario, where a user attempts to view content offered by a service provider 240.

Initially, the user 200 purchases a registration kit 250. The registration kit 250 contains set-top box 220 and software application (which may be supplied on CD or on other media), as well as a scratch card which contains a software key. The user 200 then installs the software application on her mobile device 210 using the key obtained from the scratch card as well as a unique identifier of the STB. This completes registration of the STB; the STB is now personalized to the particular user and with her mobile device. Also, during this registration, the service provider 240 updates its databases based on the registration of user 200 using her details, including the registration kit number and STB unique number. Then, the service provider associates symmetric encryption keys with the registration kit number and STB unique number for the given user. The user is now active and registered and can access content provided by the SP 140.

Later, when the user requests particular content, the service provider encrypts the content using the symmetric key of the given user stored during the registration phase and transmits the same encrypted content along with encrypted versions of the symmetric keys.

In order to access the content broadcasted by the service provider 240, the registered and active user 100 invokes the mobile application installed on her mobile device 110. The mobile application then requests that the user enter a password for execution. If the password supplied is correct then the application gives the user a one-time token to watch the encrypted content. Thus the software generates a dynamic key or token to view the content broadcasted by the SP. The user may, in this implementation, change the software password as she wishes. If the password supplied by the user is incorrect, the user will not be able to access the content.

Next the user inputs the dynamic key generated by the mobile device into the STB. In subsequent attempts, as long as the mobile device 110 is configured to continue to generate content tokens, the content can be viewed by the user.

If the system is configured to enforce time- and event-based licenses, in one implementation, the software application code is bundled with a license certificate which identifies the time or event restrictions. Thus, during registration, loading the software application bundle into the mobile device also comprises loading a signer certificate as well as a digital signature for the license certificate with the software application bundle. In one implementation, the software application bundle is installed into a non-volatile memory of the mobile device, in order that the certificate and application remain stable. Thereafter, access to the content occurs only if the access time is within the license period of the software application for the given user. If it is not, then access will not be granted.

In one scenario, when the mobile device has exhausted its ability to generate one-time keys and the user's subscription is not expired, the user can reinitiate a call to reactivate the mobile device for generating the dynamic one time key. In one implementation, this is performed as the recharging described above.

Additionally, once the token value is no longer valid, the STB 120 may not validate the user unless the user performs a recharging. In one implementation, this is done using a recharge kit to re-perform registration and so that the service provider can update its database with given user details such as STB number and recharge kit number. The recharging kit can contain data, as well as mobile applications, in a similar manner to the registration kit. In another implementation, the recharge kit may only contain recharging data, and will not replace the mobile application on the mobile device.

Examples of Technique Benefits

The techniques and tools described herein facilitate key agreement between set-top box and mobile device with forward secrecy and are resilient to replay, forgery, man-in-the-middle and insider attacks. The techniques also provide flexible options for a user to change his or her password on the mobile application installed on his mobile device. The techniques also helps securely enforce conditional access systems using time or event licensing. The techniques also do not require an online remote server by the service provider for access verification.

Thus, these techniques achieve a high security confidence level along with minimal burden on the user and without an additional requirement of a dedicated hardware except a mobile device 110. The techniques can also be extended to other types of access model such as: subscriptions, rentals, and trial licenses such as try-before-you-buy or try only. Additionally, even though the techniques do not require a smart card, they are nonetheless able to binds access to a set-top box and mobile to allow license-based viewing and even allow for the provision of changing to a different mobile device after fulfilling a registration requirement. Finally, despite registration, the techniques allow that privacy of the end consumer can be retained if desired, and are thus useful in a scenario where privacy is of great concern.

Having described and illustrated the principles of the systems and methods described herein with reference to described implementations, it will be recognized that the described implementations can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

Exemplary Computing Environment

The above content protection techniques can be performed on any of a variety of computing devices. The techniques can be implemented in hardware circuitry, as well as in software executing within a computer or other computing environment, such as shown in FIG. 9.

Figure 9:
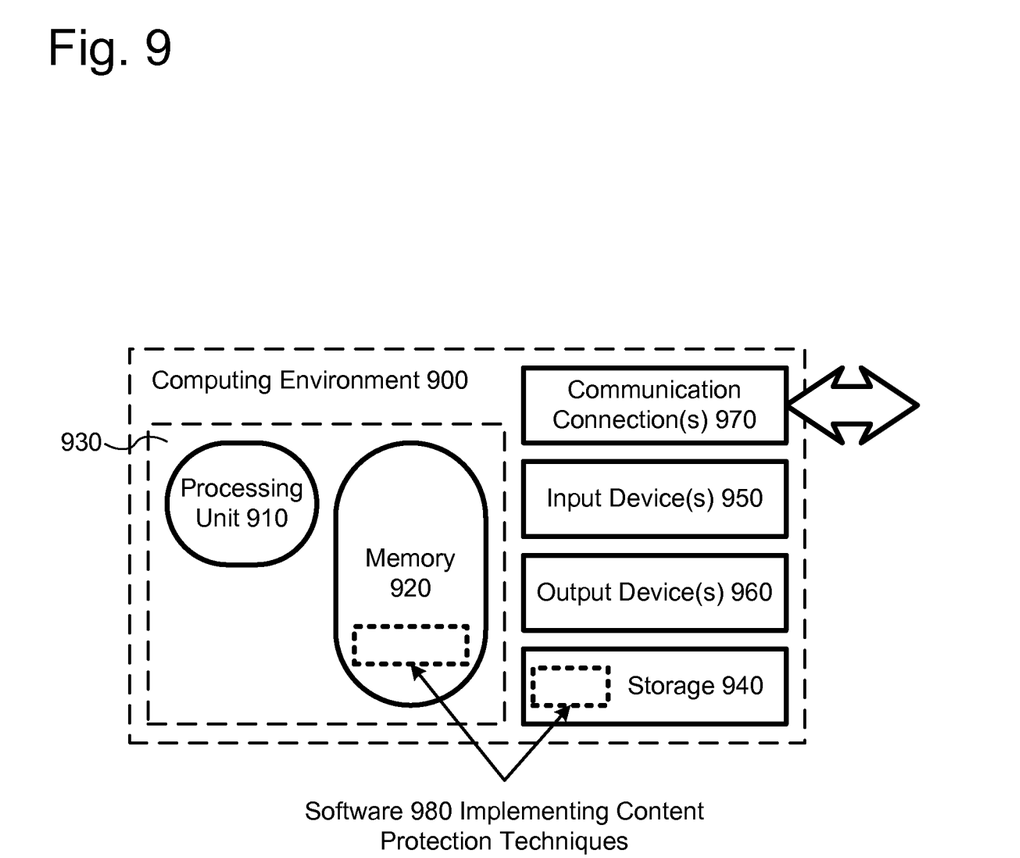
FIG. 9 is a block diagram of a suitable computing environment for implementing techniques described herein.

FIG. 9 illustrates a generalized example of a suitable computing environment (900) in which described embodiments may be implemented. The computing environment (900) is not intended to suggest any limitation as to the scope of use or functionality of the invention, since the present invention may be implemented in diverse general-purpose or special-purpose computing environments.

With reference to FIG. 9, the computing environment (900) includes at least one processing unit (910) and memory (920). In FIG. 9, this most basic configuration (930) is included within a dashed line. The processing unit (910) executes computer-executable instructions and may be a real or a virtual processor. In a multiprocessing system, multiple processing units execute computer-executable instructions to increase processing power. The memory (920) may be volatile memory (e.g., registers, cache, RAM), non-volatile memory (e.g., ROM, EEPROM, flash memory, etc.), or some combination of the two. The memory (920) stores software (980) implementing the described techniques.

A computing environment may have additional features. For example, the computing environment (900) includes storage (940), one or more input devices (950), one or more output devices (960), and one or more communication connections (970). An interconnection mechanism (not shown) such as a bus, controller, or network, interconnects the components of the computing environment (900). Typically, operating system software (not shown) provides an operating environment for other software executing in the computing environment (900), and coordinates activities of the components of the computing environment (900).

The storage (940) may be removable or non-removable, and includes magnetic disks, USB drives, magnetic tapes or cassettes, CD-ROMs, CD-RWs, DVDs, BlueRay discs or combination thereof or any other medium which can be used to store information and which can be accessed within the computing environment (900). The storage (940) stores instructions for the software (980) implementing the described techniques.

The input device(s) (950) may be a touch input device such as a keyboard, mouse, pen, or trackball, a voice input device, a scanning device, or another device that provides input to the computing environment (900). For audio, the input device(s) (950) may be a sound card or similar device that accepts audio input in analog or digital form, or a CD-ROM reader that provides audio samples to the computing environment. The output device(s) (960) may be a display, printer, speaker, CD writer, or another device that provides output from the computing environment (900).

The communication connection(s) (970) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier. The techniques described herein can be described in the general context of computer-readable media. Computer-readable media are any available media that can be accessed within a computing environment. By way of example, and not limitation, with the computing environment (900), computer-readable media include memory (920), storage (940), and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc., which perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," and "compute" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope and spirit of the following claims and equivalents thereto.

We claim:

1. A method for controlling access to protected content provided by a service provider, the method comprising:
    during a registration process for a given user, storing an association between a symmetric encryption key and a unique identifier of a set-top box for the given user;
    encrypting the protected content using the symmetric encryption key associated with the unique identifier of the set-top box, wherein the set-top box is configured to validate access to view the protected content by accepting a content token;
    encrypting the symmetric encryption key to an encrypted symmetric encryption key, wherein the encrypted symmetric encryption key is decryptable with the content token serving as a dynamically-generated encryption key, wherein a mobile application configured to run on a mobile device that is physically separate from the set-top box is configured to generate the content token on the mobile device that is physically separate from the set-top box in response to a user request for access to view the protected content; and
    transmitting the encrypted protected content and the encrypted symmetric encryption key to the set-top box.

2. The method of claim 1, further comprising:
    providing a user registration kit comprising a set of registration parameters for entry into a mobile device.

3. The method of claim 2, wherein the user registration kit comprises:
    a registration kit number,
    the mobile application,
    and a secret code.

4. The method of claim 3, wherein the secret code is an alphanumeric key for the mobile application to be installed on the mobile device, the mobile application operable to generate the dynamically-generated encryption key.

5. The method of claim 4, wherein the secret code is provided to be installed on the mobile device using a scratch card.

6. The method of claim 2, further comprising:
personalizing the mobile device of the user and the set-top box using the registration kit.

7. The method of claim 2, wherein storing the association comprises:
updating a database with the unique identifier of the set-top box number for the user, a registration kit number for the user, and a secret code.

8. The method of claim 1, wherein the mobile application configured to run on the mobile device is configured to provide the content token only if a password supplied by the user is correct.

9. The method of claim 1, further comprising recharging of the set-top box and the software application by using a recharge kit to grant access to the protected content provided by the service provider after the registration process.

10. The method of claim 1, wherein the mobile application configured to run on the mobile device is configured to determine that the mobile application has exhausted its content tokens and new content tokens cannot be provided until a recharge.

11. The method as recited in claim 10, further comprising, when a subscription for the mobile application is not expired but the application has exhausted its content tokens, requesting a new mobile application.

12. The method of claim 1, further comprising enforcing a time-based access license for the user to access the protected content, wherein the mobile application is bundled in an application bundle with a license certificate.

13. The method of claim 12, further comprising loading the application bundle into the mobile device by loading at least one chosen from the group consisting of a signer certificate, a digital signature for a service code, and a digital signature for the license certificate with the application bundle.

14. The method of claim 12, wherein enforcing the time-based access license comprises authenticating the license certificate of the user.

15. The method of claim 1, wherein the set-top box provides access to content only if an access time is within a license period.

16. One or more computer-readable storage media not consisting of a signal containing-instructions which cause a computer to perform a method for controlling access to content from a service provider encrypted with a symmetric key and accompanied by an encrypted version of the symmetric key, the method comprising:
accepting a set of parameters in a mobile device of a user that is physically separate from a set-top box, wherein the parameters comprise a unique identifier of the set-top box;
as part of a registration process, sending the parameters to the service provider for storage in a service provider database as associated with the user;
upon request by a user, in the mobile device that is physically separate from the set-top box, generating a dynamic key for viewing the content on a set-top box, wherein the dynamic key generated by the mobile device that is physically separate from the set-top box is operable to decrypt the encrypted version of the symmetric key used to encrypt the content; and
inputting the dynamic key into the set-top box to access the content.

17. The one or more computer-readable storage media not consisting of a signal of claim 16, wherein the method further comprises recharging the set-top box using a recharge kit after the registration process.

18. The one or more computer-readable storage media not consisting of a signal of claim 16, wherein the method further comprises providing a license certificate for validation by the set-top box to enforce a time-based access license for the user.

19. The one or more computer-readable storage media not consisting of a signal of claim 16, wherein the method further comprises requesting a new dynamic key generating facility when dynamic keys on the mobile device are exhausted.

20. The one or more computer-readable storage media not consisting of a signal of claim 16, wherein:
the method further comprises storing a license certificate in the mobile device, wherein the license certificate identifies a license time restriction period; and
the license certificate limits access time of the content to access times within the license time restriction period.

21. The one or more computer-readable storage media not consisting of a signal of claim 16, wherein:
the method further comprises storing a digital signature for the license certificate and a signer certificate for a digital signer of the license certificate in the mobile device.

22. The one or more computer-readable storage media not consisting of a signal of claim 16, wherein:
the method further comprises accepting a password by the mobile device; and
verifying that the password is correct before generating the dynamic key.

23. A system comprising:
a set-top box;
a mobile device;
one or more set-top box program modules executable on the set-top box having a unique identifier and configured to receive protected content from a service provider;
a mobile application executable on the mobile device controllable by a user and physically separate from the set-top box;
wherein the mobile application causes the mobile device to perform a method comprising:
accepting a set of parameters, wherein the parameters comprise the unique identifier of the set-top box;
as part of a registration process, sending the parameters to the service provider for storage in a service provider database as associated with the user;
upon request by the user, generating a dynamic key for viewing the protected content on the set-top box, wherein the dynamic key is operable to decrypt a symmetric key used to encrypt the protected content; and
inputting the dynamic key into the set-top box; and
wherein the one or more set-top box program modules cause the set-top box to perform a method comprising:
receiving, from the service provider, the protected content and an encrypted symmetric key used to encrypt the protected content;
receiving the dynamic key from the mobile device;
decrypting the encrypted symmetric key with the dynamic key received from the mobile device; and
decrypting the protected content with the decrypted symmetric key.

* * * * *